United States Patent [19]

Adams

[11] Patent Number: 4,703,818

[45] Date of Patent: Nov. 3, 1987

[54] GROUND WHEEL TAKEOFF SYSTEM FOR FERTILIZER SPREADERS OR THE LIKE

[75] Inventor: William W. Adams, DeWitt, Ark.

[73] Assignee: Industrial Iron Works, Incorporated, DeWitt, Ark.

[21] Appl. No.: 885,030

[22] Filed: Jul. 14, 1986

[51] Int. Cl.$^4$ ............................................. B60K 25/08
[52] U.S. Cl. ..................................... 180/53.6; 74/13; 239/685
[58] Field of Search ................... 180/53.6, 53.1; 74/13; 239/685

[56] References Cited

U.S. PATENT DOCUMENTS

| 947,588 | 1/1910 | Brown | 180/53.6 |
| 1,053,834 | 2/1913 | Langton | 180/53.6 |
| 1,270,491 | 6/1918 | Brown | 180/53.6 |
| 3,774,709 | 11/1973 | Granberg | 180/53.6 |

Primary Examiner—David M. Mitchell
Assistant Examiner—Ross Weaver
Attorney, Agent, or Firm—Robert R. Keegan

[57] ABSTRACT

There is disclosed a ground wheel takeoff drive system for fertilizer spreaders or the like including a gearbox being adapted to reside at least partly inside one of the speader's pneumatic tire and wheel cavities and having a hollow shaft journalled therein through which passes the axle on which the tire and wheel is mounted. The hollow shaft is secured to rotate with the ground wheel and a restraining element causes the gearbox to be restrained from rotation. The gearbox has a sprocket which is geared to be driven from the rotating hollow shaft, a remote control cable arrangement is connected to a gear lever on the gearbox which slides a driven gear in and out of engagement with a gear secured to the hollow shaft so that the gearbox sprocket motion may be disabled or enabled from a remote position; a sprocket chain is provided with suitable idlers for driving a sprocket wheel connected in a conventional manner to the gear drive mechanism for the fertilizer spreader.

13 Claims, 6 Drawing Figures

FIG. I

GROUND WHEEL TAKEOFF SYSTEM FOR FERTILIZER SPREADERS OR THE LIKE

The present invention relates to ground wheel takeoff drive systems used in unpowered wheeled vehicles to impart motion from the rotating ground wheel to conveyors, fans, paddles or other mechanisms on the vehicle.

A common method of imparting motion to mechanisms on fertilizer spreaders or other such vehicles is to provide a driven wheel in frictional engagement with the rubber tire of the ground wheel. Such systems are quite workable in optimum conditions, but when the vehicle is used in wet fields or other adverse conditions the frictional engagement with the tire becomes unreliable and significant slippage can cause the driven mechanism to run at slower than the desired rate of speed. This results in inaccurate application of fertilizer or other improper functions of the apparatus.

Typically, fertilizer spreaders do not have a rotating axle which can be utilized as a takeoff drive element but rather the vehicle wheels are freely rotating on a spindle secured to a nonrotating axle on a rocker suspension or other type of suspension. Thus some prior takeoff mechanisms which utilize a rotating axle would be unsuitable for adaptation to a ground wheel takeoff drive system for fertilizer spreaders or the like. Ground wheel takeoff drive systems for fertilizer spreaders or the like which rely on frictional engagement with a rubber tire are exemplified by U.S. Pat. No. 4,283,014 to Devorak (Granted Aug. 11, 1981). A hydraulic takeoff drive arrangement is disclosed in U.S. Pat. No. 3,019,025 to G. V. Young (Granted Jan. 30, 1962).

The present invention overcomes the disadvantages of prior apparatus by utilizing a direct drive through a gearbox having a hollow shaft journalled therein which hollow shaft fits over the axle or spindle for a ground wheel. The hollow shaft has a flange which connects to the ground wheel hub causing the shaft to rotate therewith while the gearbox is held stationary by engagement with a stationary part of the vehicle. The internal gearing in the gearbox is arranged to be placed in an engaged or neutral position, and when in the engaged position a sprocket on the gearbox is rotated to drive a chain belt and a frame mounted sprocket and gear mechanism for a conveyor, impeller fans, etc. In this manner positive drive rather than frictional engagement is relied upon yet the mechanism involved is quite compact and resides for the most part in the central open space surrounded by the vehicle tire and rim.

The chain drive is provided with an idler and thus movement of the axle to which the gearbox is mounted is readily compensated by the sprocket chain idler mechanism. The gearbox is preferably sealed and oil filled so that friction is minimized and little maintenance is required while the apparatus is still rugged and durable in adverse field conditions. Replacement of the sprocket chain when necessary is readily accomplished due to ready accessibility of the sprocket chain.

In addition to providing the above features and advantages it is an object of the present invention to provide a ground wheel takeoff drive system for unpowered wheeled vehicles including a gearbox with a hollow system adapted to encircle the ground wheel axle and be secured to rotate with the ground wheel.

It is another object of the present invention to provide a positive gear drive ground wheel takeoff arrangement for fertilizer spreaders or the like wherein the gearbox connected for imparting rotation for the wheel to a sprocket chain is secured generally within the outline of the ground wheel tire and rim.

It is still another object of the present invention to provide a ground wheel takeoff drive system for fertilizer spreaders or the like with a gearbox secured within the ground wheel and rim and having a gear engagement lever connected through a remote operating system to permit the gearbox to be engaged and disengaged remotely.

Other objects and advantages of the present invention will be apparent from consideration of the following description in conjunction with the appended drawings in which.

Figure 1:
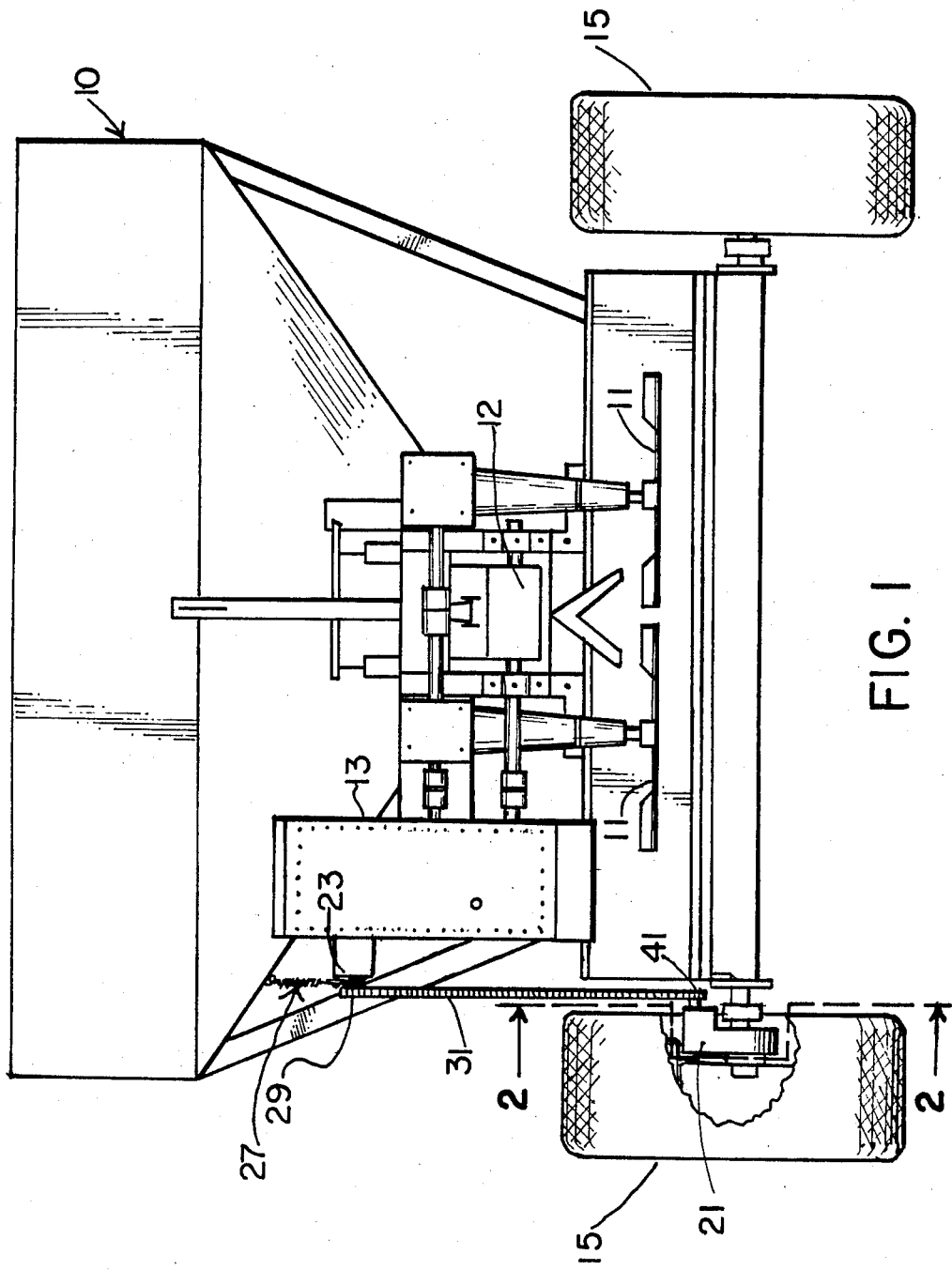
FIG. 1 is a rear plan view of the fertilizer spreader provided with the ground wheel takeoff drive system according to the present invention.
Figure 2:
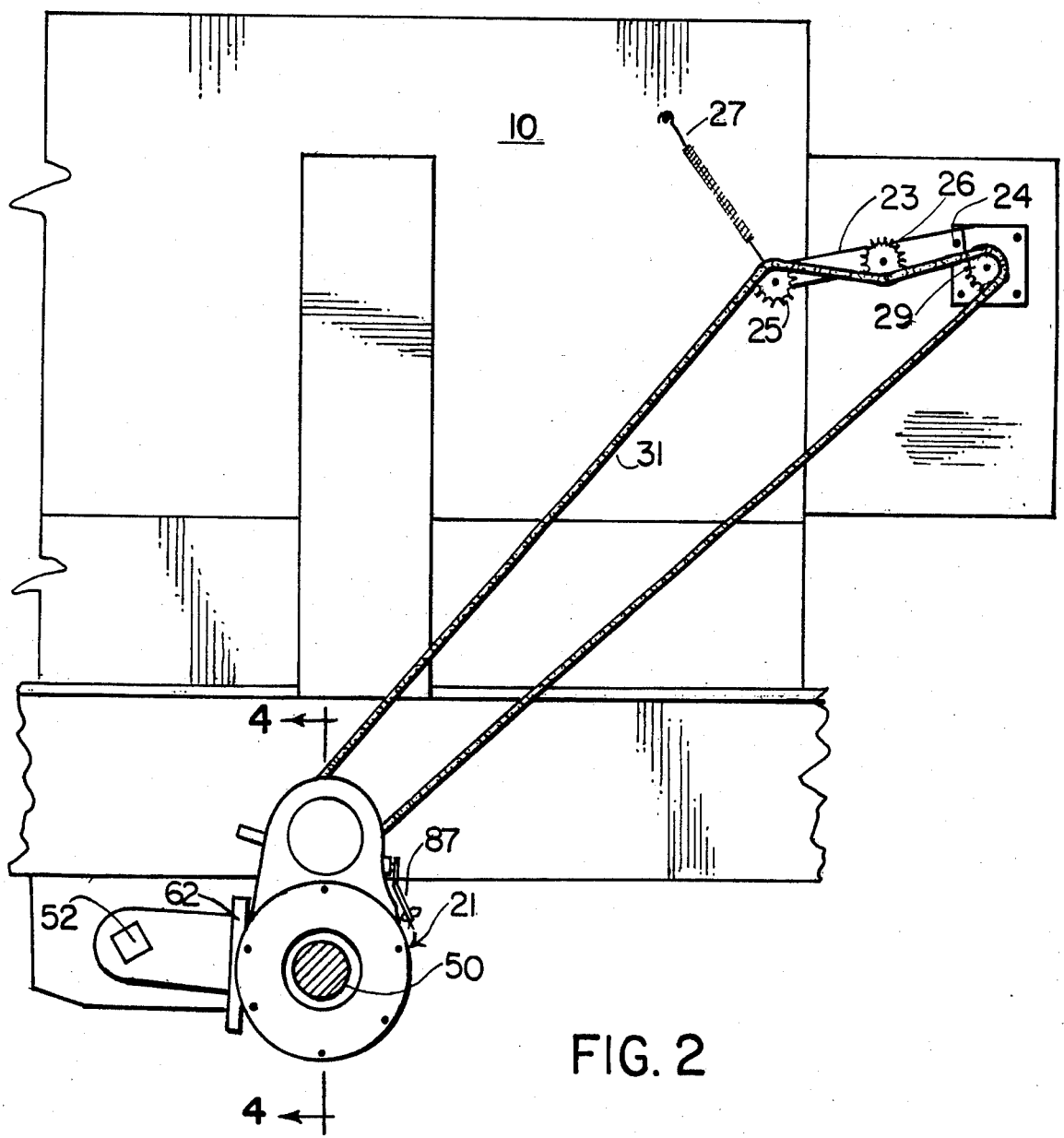
FIG. 2 is an enlarged fragmentary side elevational view partially in section of the apparatus of FIG. 1.

Referring now to drawings and particularly FIGS. 1 and 2, a fertilizer spreader is shown which is of generally conventional construction having impeller fans or paddles 11 for distributing the fertilizer and a conveyor 12 for feeding fertilizer to the fans 11. A conventional gear mechanism 13 is provided for driving conveyor 12 and fans 11.

A sprocket and shaft 29 serves as the input to power the gear mechanism 13 and sprocket 29 is engaged by chain belt 31 which is driven by sprocket 41 on gearbox 21 of the ground wheel takeoff system.

Because the ground wheel is mounted on a resilient suspension the distance between sprocket 41 and sprocket 29 may vary by several inches and an idler mechanism with two sprockets 25 and 26, an arm 23 pivoted at pin 24 and a spring 27 for urging the arm upward keeps the slack out of chain belt 31 and maintains proper tension therein.

Figure 3:
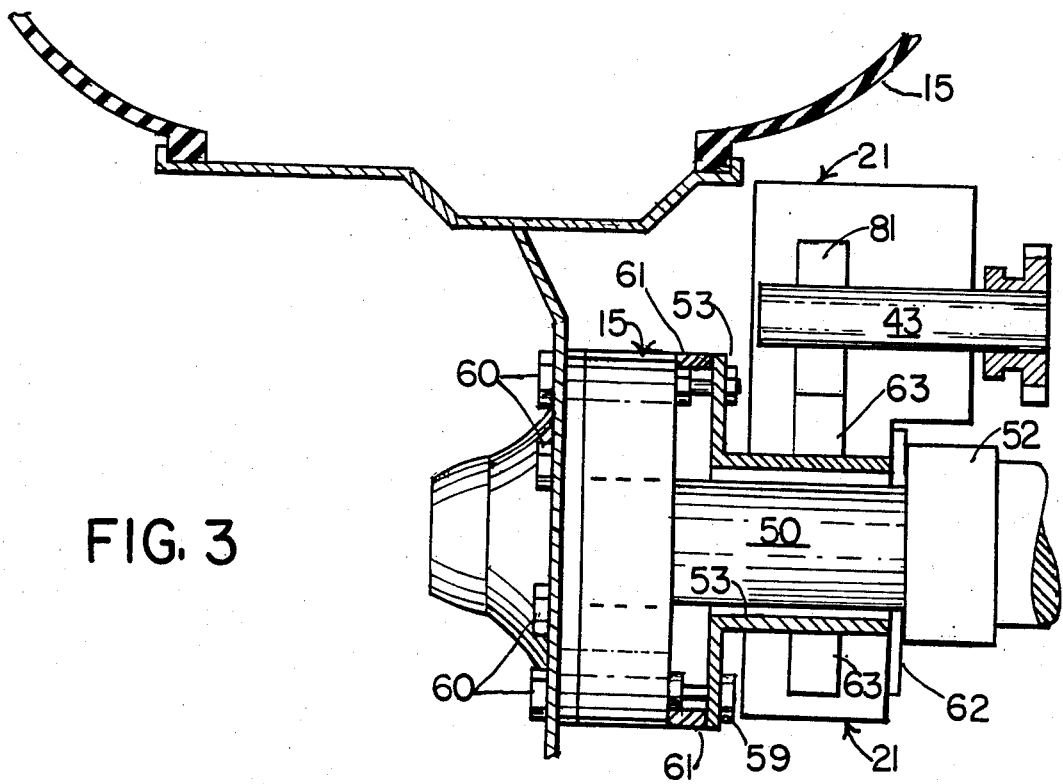
FIG. 3 is an enlarged sectional view of the gearbox portion of the apparatus taken along the line 3—3 in FIG. 2.

Wheel 15 is mounted on an axle 50 which is nonrotating and is rigidly secured to suspension arm 52 of conventional construction, as seen in FIGS. 2 and 3.

Axle 50 for wheel 15 passes through a hollow shaft 51 which is journalled in bearings 65 and 67 in gearbox 21. A flange 53 is provided on shaft 51 which bears against a spacer ring 61 which in turn bears against the hub of wheel 15. By selecting a spacer 61 of appropriate width the position of gearbox 21 may be determined so that interferences with any part of wheel 15 is avoided. Flange 53 and spacer ring 61 may be secured to wheel 15 by placing bolts 60 through existing holes or holes specially provided in wheel 15; nuts 59 engage bolts 60 to hold shaft 51 and flange 53 securely in place concentric with wheel 15. This also positions gearbox 21 which is thereby constrained to only rotational movement relative to shaft 51. In the illustrated embodiment a bar 62 is welded or otherwise secured to suspension arm 52 in a vertical position immediately adjacent gearbox 21 thereby preventing rotational movement of gearbox 21 relative to suspension 52.

Figure 6:
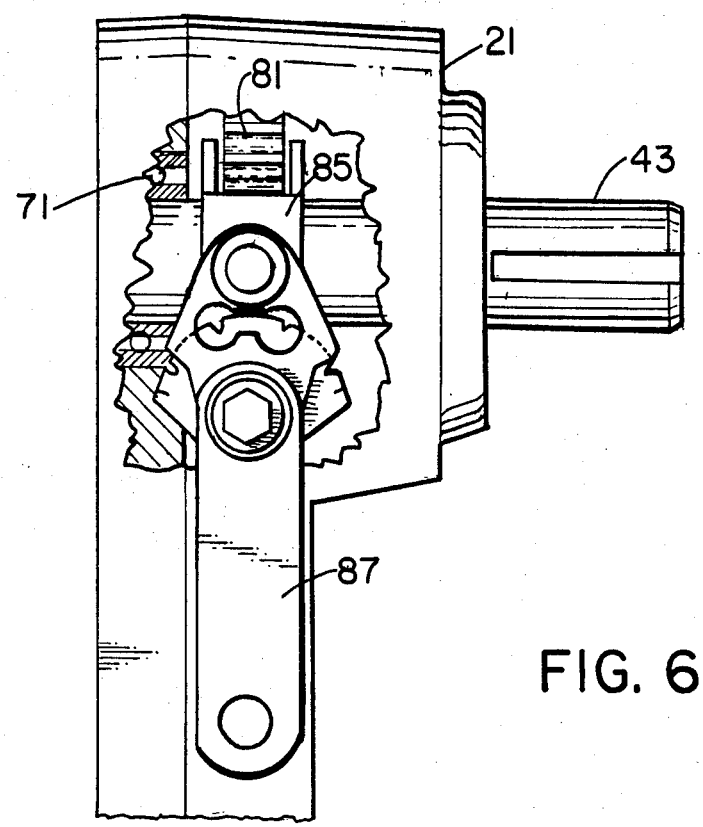
FIG. 6 is a view partially broken away taken along the line 6—6 in FIG. 5.
Figure 4:
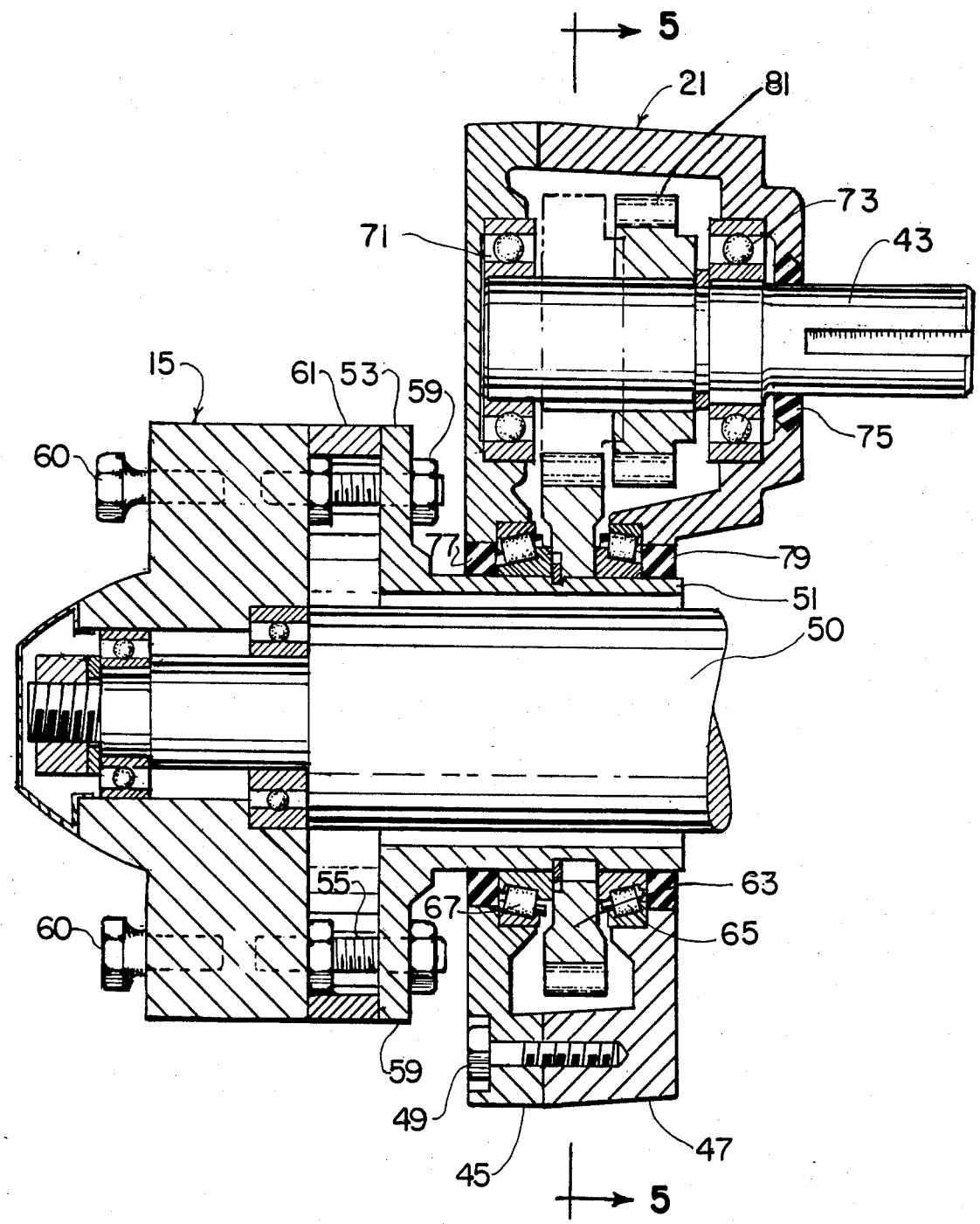
FIG. 4 is a detailed sectional view showing the interior of the gearbox of FIG. 3.
Figure 5:
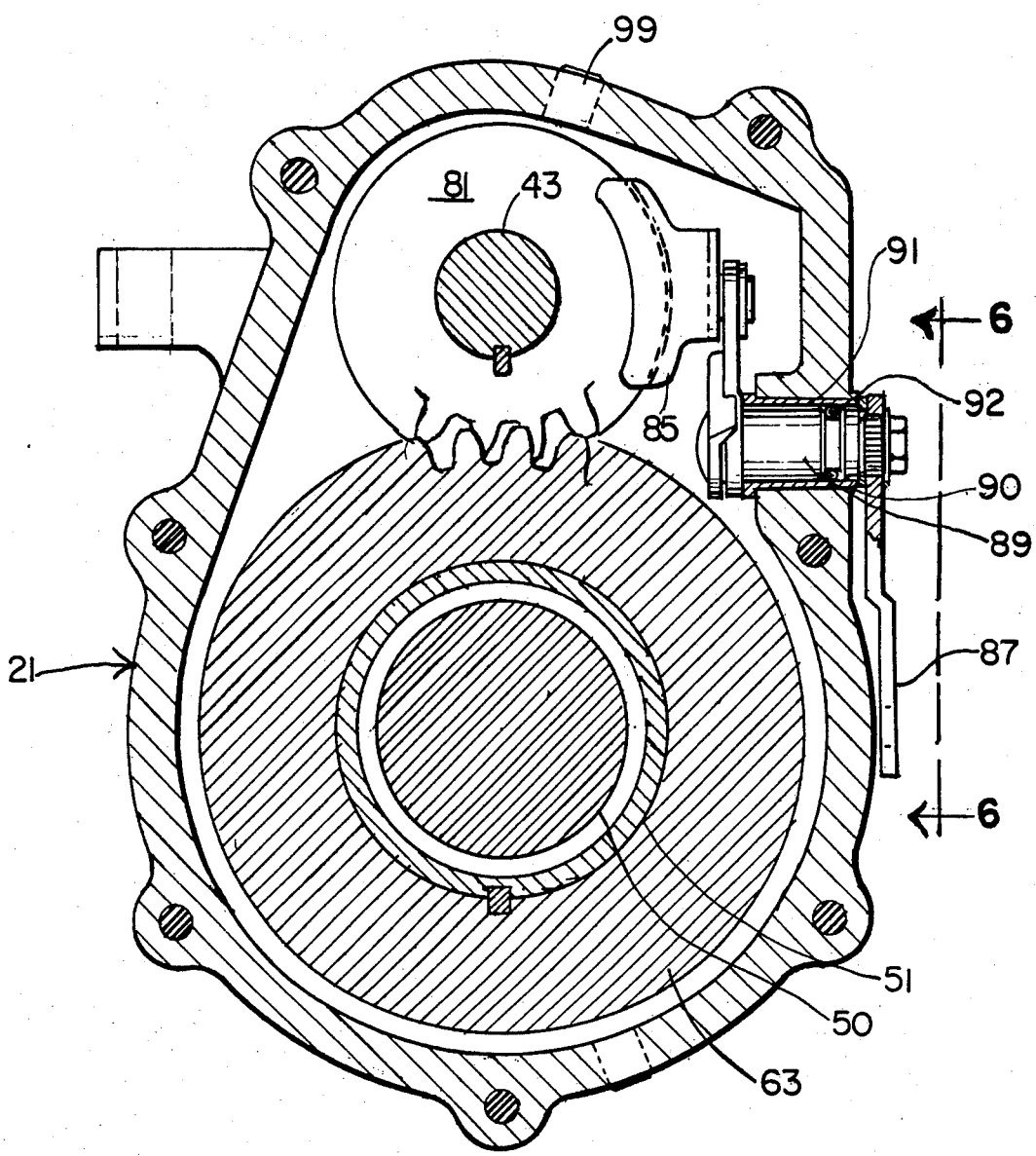
FIG. 5 is an enlarged partially diagramatic drawing taken along the line 5—5 in FIG. 4.

Referring now to FIGS. 4 to 6, main gear 63 of gearbox 21 is keyed to hollow shaft 51 to rotate therewith and thus rotates within the housing of gearbox 21.

The shaft 43 is mounted in bearings 71 and 73 and extends through bearing 73 to the outside of the housing of gearbox 21. A seal for shaft 43 is shown schematically at 75. Seals for shaft 51 are shown schematically at 77 and 79. The housing for gearbox 21 is rendered liquid-tight by seals 75, 77 and 79 to provide a casing which may be fitted by oil for lubrication of bearings and gears. A conventional oil plug 99 gives access to the interior of gearbox 21 for adding or draining oil. Of course other conventional means could be provided for lubrication to the extent lubrication was necessary; alternatively bearings and other parts not requiring lubrication could be employed.

A spur gear 81 is slidably mounted on shaft 43 and splined in a conventional manner to cause shaft 43 to rotate with gear 81. As shown in FIG. 4, gear 81 is disengaged from, and does not mesh with, gear 63. The position of gear 81 shown in phantom lines in FIG. 4 is the engaged position where the rotation of shaft 51 causes equal rotation of gear 63 which in turn rotates gear 81 at approximately twice the rotational speed of shaft 51. Thus in the engaged position shaft 53 rotates at approximately twice the speed of shaft 51 while shaft 43 is freely rotating in the disengaged position for gear 81.

As best shown in FIGS. 6 and 7, the sliding movement of gear 81 is controlled by yoke 85 which is moved laterally by lever 87 through shaft 89 residing in opening 90 in the housing of gearbox 21. Opening 90 is sealed by bushing 91 and O-ring 92.

Lever 87 is remotely actuated by a hollow-cable-wire motion transmitting device or by other suitable means (not shown).

From the foregoing description and by reference to the drawings it will be seen that apparatus according to the invention provides a ground wheel takeoff mechanism which is very compact and can be easily installed, removed or replaced. The gearbox 21 is located above the vehicle axle so that it is not likely to be damaged by striking obstructions and it is not generally exposed to water, mud, vegetation or the like as the vehicle passes through rough or soggy terrain. At the same time the drive sprocket 41 is accessible so that the drive chain can be readily removed for maintenance or replacement.

The disengagable gear mechanism not only permits the remote starting and stopping of the conveyor and impellers, but also allows the vehicle to be transported forward or backward in a substantially freewheeling mode as if the power takeoff were not present. While a clutch could be utilized for disabling the takeoff drive, the illustrated gear mechanism is preferred because it eliminates any possibility of slippage in the engaged position. The gears are readily engaged and disengaged because the rotational motion of shaft 51 and gear 63 is relatively slow.

Since the gearbox 21 resides generally within the outline of the oversized tires of wheel 15 no substantial widening of the wheel base of the fertilizer spreader or other vehicle is necessary to accommodate the gearbox mechanism. Of course the wheel takeoff mechanism of the invention completely eliminates slippage or mud clogging problems with other systems having friction wheels engaging the vehicle tires. Such problems are almost impossible to overcome with the friction drive mechanism due to the frequent use of such vehicles in wet and muddy fields. With the apparatus according to the invention muddy fields conditions create virtually no problems with the ground wheel takeoff drive system. It will be understood that chain and sprocket covers and other apparatus desired for operator's safety have not been illustrated, but may be employed as required in a conventional fashion.

The particular gearing arrangement shown is quite suitable for the purpose, but any other equivalent gear mechanism could be substituted. Also the connection of the gearbox sprocket 43 to the fertilizer spreader gear-driver mechanism 13 by way of chain belt drive could be replaced by an equivalent power drive mechanism such as gears and shafts or the like. Also the specific application of the ground wheel takeoff drive system for fertilizer spreaders is illustrative only, an equivalent mechanism could be applied to salt and sand spreaders for trucks or in any situation where a mechanical rotating power takeoff from a ground wheel is desirable to operate equipment on a moving vehicle. To a lesser extent the mechanism according to the invention would be suitable to transmit power in the opposite direction so that one or more wheels of the vehicle would be driven through the chain belt and gearbox from a power source on the vehicle.

In addition to the variations and modification to the invention shown, described and suggested herein, other modifications will be apparent to those of skill in the art and accordingly the scope of the invention is not to be considered limited to the embodiments and modifications shown or suggested but is rather to be determined by reference to the appended claims.

What is claimed is:

1. In a fertilizer spreader or other unpowered wheeled vehicle having at least two wheels and at least one non-rotating axle, the improvement comprising,
    a gearbox with a housing,
    a hollow shaft journalled in said gearbox and having a central opening with a diameter larger than said non-rotating axle of said vehicle,
    means for securing said hollow shaft to the inside of one of said ground wheels, with said axle passing through said hollow shaft,
    means for engaging the housing of said gearbox by a nonrotating portion of said vehicle,
    a gear fixedly mounted on said hollow shaft inside said housing,
    an output shaft rotatably mounted parallel to said hollow shaft in said gearbox and partially extending outside said housing,
    a driven gear slidably mounted on and rotationally engaging said output shaft, said driven gear being adapted to mesh with the first said gear in one position and being slidable to be out of mesh in another position,
    lever means for shifting the position of said driven gear without restraining its rotation, and
    means for transmitting the motion of said output shaft to a mechanism on said vehicle.

2. Apparatus as recited in claim 1 further including oil seals for sealing the opening of said hollow shaft and said output shaft in said gearbox, and wherein said housing is substantially liquid tight to provide an oil reservoir for the lubrication of the interior of said gear box.

3. Apparatus as recited in claim 1 wherein said lever means includes a shaft extending through a sealed opening in said housing and a yoke connected to said shaft for shifting the positon of said driven gear.

4. Apparatus as recited in claim 1 wherein said means for transmitting the motion of said output shaft includes a sprocket on said shaft, a chain belt engaged by such sprocket, a driven sprocket connected to a mechanism on said vehicle, and at least one idler sprocket for removing slack and tension of said chain belt.

5. Apparatus as recited in claim 1 wherein said hollow shaft is provided with a flange having holes for bolts connecting to the hub of said one of said wheels.

6. Apparatus as recited in claim 5 further including a spacer ring adapted to be placed between said flange and the hub of said wheel.

7. Apparatus as recited in claim 1 wherein the total dimension of said gearbox in a direction parallel to the axis of said hollow shaft is not substantially greater than one-half the total dimension of a wheel of said vehicle parallel to the rotational axis of said wheel.

8. A ground wheel takeoff drive system for fertilizer spreaders or other unpowered wheeled vehicles having at least two wheels and at least one non-rotating axle, said system comprising, a gearbox with a liquid tight housing, a hollow shaft journalled in and extending through said gearbox and having its central opening diameter larger than that of said non-rotating axle of said vehicle, means including a flange on its outer end for securing said shaft to the inside of one of said ground wheels with said axle passing through said hollow shaft, means for engaging the housing of said gearbox by a suspension for said axle, a gear fixedly secured on said hollow shaft inside said housing, an output shaft rotatably mounted parallel to said holow shaft in said gearbox and partially extending outside said housing, a driven gear slidably mounted on and rotationally engaging said output shaft, said driven gear being adapted to mesh with the first said gear in one position and being slidable to out of mesh in another position, lever means for shifting the position of said driven gear without restraining its rotation, and means for transmitting the motion of said output shaft to a mechanism on said vehicle including a sprocket on said shaft, a chainbelt engaged by such sprocket, a driven sprocket connected to a mechanism on said vehicle, and at least one idler sprocket for removing slack and tensing of said chainbelt.

9. Apparatus as recited in claim 8 further including oil seals for sealing the opening for said hollow shaft and said output shaft in said gearbox.

10. Apparatus as recited in claim 8 wherein said lever means includes a shaft extending through a sealed opening in said housing and a yoke connected to said shaft within said housing for shifting the position of said driven gear.

11. Apparatus as recited in claim 8 wherein said flange is provided with holes for bolts connecting to the hub of one of said wheels.

12. Apparatus as recited in claim 11 further including a spacer ring adapted to be placed between said flange and the hub of said wheel.

13. Apparatus as recited in claim 8 wherein the total dimension of said gearbox in a direction parallel to the axis of said hollow shaft is not substantially greater than one-half the total dimension of a wheel of said vehicle parallel to the rotational axis of said wheel.

* * * * *